United States Patent

Peel et al.

[15] 3,641,338
[45] Feb. 8, 1972

[54] TRAIN LENGTH MEASUREMENT SYSTEM

[72] Inventors: Richard V. Peel, Diamond Bar; Billie W. Phillips, Upland, both of Calif.

[73] Assignee: Marquardt Industrial Products Co., Cucamonga, Calif.

[22] Filed: Feb. 26, 1970

[21] Appl. No.: 14,391

[52] U.S. Cl. ...................................... 246/1 R, 246/122 R
[51] Int. Cl. ............................................ B61l 1/02
[58] Field of Search ............................. 246/122 R, 1

[56] References Cited

UNITED STATES PATENTS

| | | | |
|---|---|---|---|
| 2,976,401 | 3/1961 | Berill | 246/1 |
| 2,954,462 | 9/1960 | Utt et al. | 246/1 |
| 3,155,350 | 11/1964 | Campbell | 246/122 R |

Primary Examiner—Arthur L. La Point
Assistant Examiner—George H. Libman
Attorney—Robert E. Geauque

[57] ABSTRACT

A system for measuring the length of a train is disclosed and includes a transmitter for applying a current to an isolated area of a pair of railroad tracks. The area of the track is generally longer than the longest expected train. A fixed voltage is provided to the computer which is indicative of the distance from one end of the measurement area to the other. A detector is positioned at the furthest end of the track measurement area. As a train appears within the two points, the wheels from the train short out the tracks causing the received voltage therein to change. When the train is detected by the detector, a voltage reading is taken which is then indicative of the distance from the transmitter to the rear of the train. This distance voltage is then combined (subtracted) with the overall fixed voltage to supply a voltage which is indicative of the length of the train.

16 Claims, 7 Drawing Figures

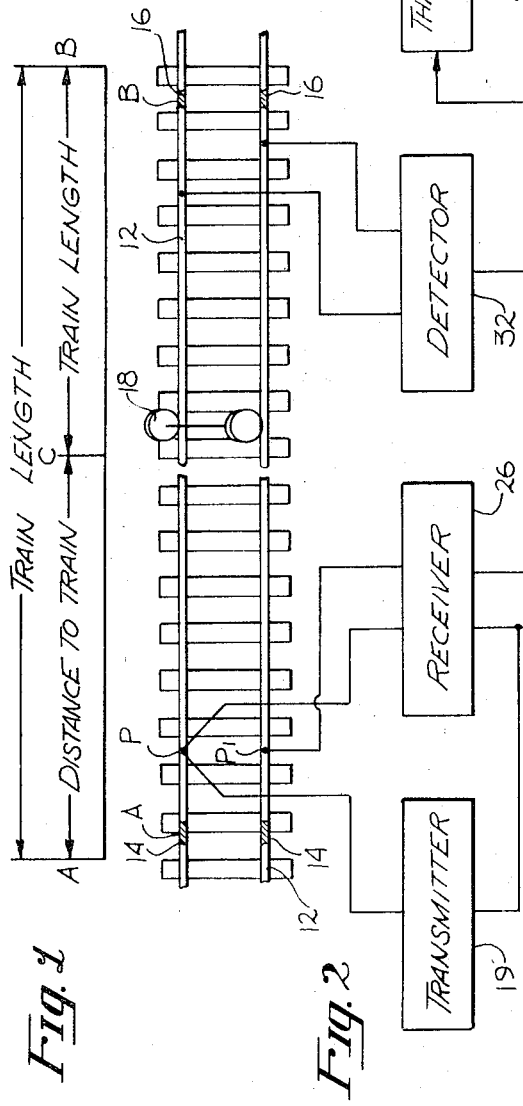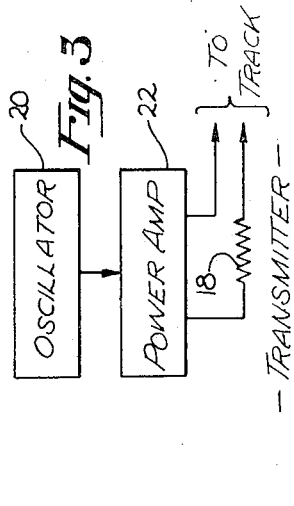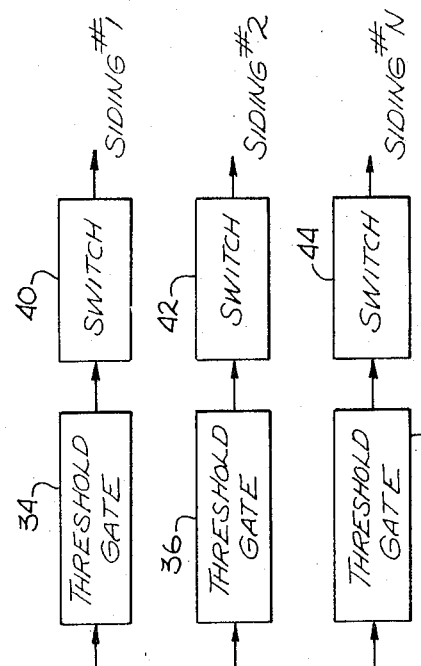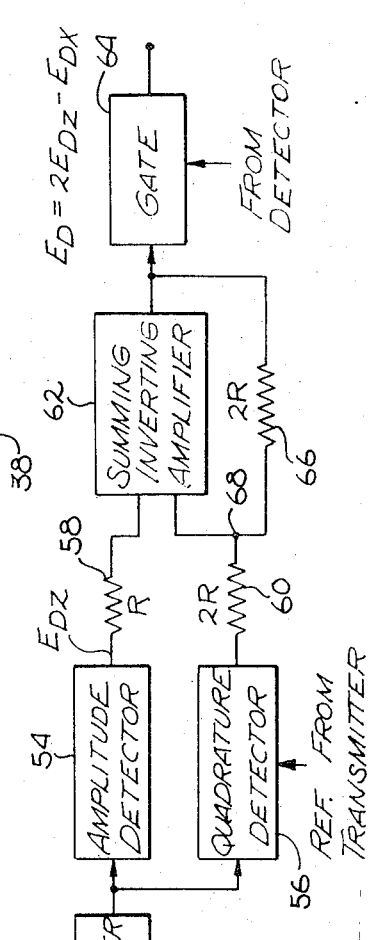

TRAIN LENGTH MEASUREMENT SYSTEM

BACKGROUND OF THE INVENTION

A. Field of the Invention

This invention relates to railroad signaling and measuring systems and more particularly to a novel and improved track length measuring system which provides a voltage indicative of the length of a train. Threshold switching may be included for indicating which siding a train can be switched to depending upon its length. The train measurement area is divided into a plurality of areas so that only short distance areas are used to increase the measurement areas.

B. Discussion of the Prior Art

In some instances it is important to know the length of a train. Such knowledge is especially useful in railroad classification yards when a train or portion thereof is to be placed onto a siding. If the length of the train is known, then by prearrangement a siding which is long enough to hold the train is switched in for that train. In order to increase the flow of traffic in the railroad yard, it is desirous to perform such measurements and switching quickly so that the tracks may be cleared for other oncoming trains. Thus the railroad industry has resorted to automatic electronic switching techniques.

Further, the knowledge of the length of a train is useful to train dispatchers. This will enable him to select an optimum siding, that is, one which is large enough in length to hold the entire train so that trains which have priority may pass other trains. Thus, the trains will be allowed to travel as far as they can before they are ultimately switched into a siding. This then expedites the trains and reduces the waiting time.

In the present era of making such classification yards automatic, it has been found that there is a need for determining the length of each group of cars. The length is a factor in operating not only track switching but also the car retarders.

Heretofore attempts have been made to electronically measure the length of a train so as to use the length information for switching purposes. All of the prior art devices have either been unsuccessful, inadequate or expensive. Thus, a need has arisen for a track length measurement which quickly measures the length of a train and switches in an appropriate siding. Yet the need is for a measurement switch system which is simple, accurate and yet inexpensive.

SUMMARY OF THE INVENTION

Briefly described, the present invention meets the above criteria. The invention includes means for applying a constant current to a pair of railroad tracks which are electrically isolated in a train measurement area from the remainder of the track. The constant current then generates a fixed voltage which is indicative of the voltage of the tracks in the area when unoccupied by a train. This fixed voltage is indicative of a measure of the overall length of the track within the area. As the train appears in the measurement area, the tracks are shorted out by the wheels and axles of the train. A receiver is connected to the track at one of the measurement areas and measures the voltage on the track within the given area. This voltage changes with respect to the distance between the receiver and the shorting wheels of the train. The voltage received by the receiver and the fixed voltage is applied to a computing circuit. A detector is positioned at the end of the measurement area of the tracks and at the end furthest from the receiver. When the train is first detected by the detector, the computing circuit computes the difference between the fixed voltage and the voltage received by the receiver providing a voltage therefrom which is indicative of the length of the train.

Threshold switching can then be employed to switch in a siding ahead of the train the length of which depends upon the value of the voltage from the computing circuit. Also if used in combination with a car retarder, the length of the train can be used as a parameter in deciding the amount of braking to be applied.

In accordance with certain aspects of this invention, the computing circuit above mentioned includes improvements therein which reduces the error caused in nonlinearity of the voltage parameters in the track received by the receiver due to the impedance and reactive components thereof.

The distance to train voltage ($E_D$) is developed in the computing circuit by two other distance voltages. One of the two voltages which is the reactance voltage ($E_{DX}$) is derived from the reactive component of the track input impedance. The other voltage is derived from the track input impedance magnitude. Because of the low ballast resistance in the tracks, neither of these voltages provides an acceptable voltage due to the nonlinearity thereof.

In accordance with one aspect of this invention, the computing circuit combines the $E_{DZ}$ and the $E_{DX}$ voltage in a unique manner to overcome the nonlinearity problem and to provide a voltage from the track which changes linearly as the distance between the train and the receiver changes. The computing circuit subtracts the $E_{DX}$ voltage from the $E_{DZ}$ voltage and adds the difference to the $E_{DZ}$ voltage to provide a linear $E_{DD}$. Thus:

$$E_D = 2E_{DZ} - E_{DX}$$

When performing track length measurements, the above configuration does in fact reduce most of the error. But some error exists to some extent if the overall length of the track within the measurement area is extensive. Thus it has been discovered that for long train measurements a plurality of detectors are more suitable for long trains.

Thus measurements are only made in the shortest distances possible. In one disclosed embodiment the measurement area is divided into two sections L1 and L2, whereby the entire area is L1+L2. A first detector is positioned at the end of area L1 and a second detector is positioned at the end of area L2. Logic switch circuits are employed to determine whether the train is in the first section L1 or in the first section and the second section L1 and L2. The measurements of the short trains are made in the L1 section and the associated detector and measurements of long trains are made in the L1 and L2 section and the detector associated with the L2 detector.

DESCRIPTION OF THE DRAWINGS

These and other features and advantages will become more apparent to those skilled in the art when taken into consideration with the following detailed description wherein like reference numerals indicate like and corresponding parts throughout the several views and wherein:

FIG. 1 is a graphic illustration showing how track length measurements are computed;

FIG. 2 is a block diagram illustrating the principles of the present invention used in connection with a track length measurement system;

FIG. 3 is a more detailed block diagram of the transmitter shown in FIG. 2;

FIG. 4 is a more detailed description of the receiver shown in FIG. 2;

DESCRIPTION OF THE PREFERRED EMBODIMENT

Figure 5:
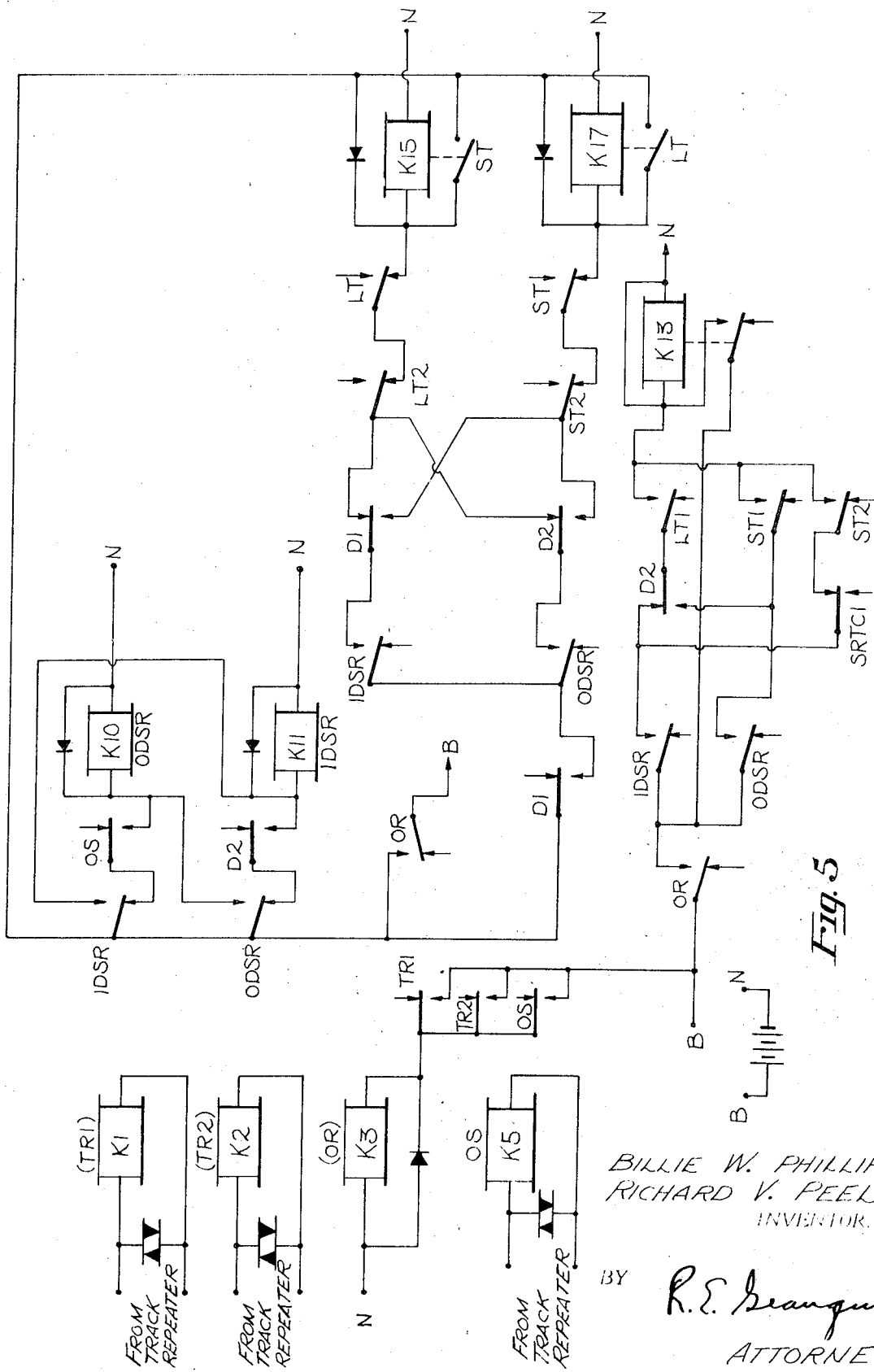
FIG. 5 is a graph showing curves of voltage v. distance for different voltage component combinations.

Turning now to FIG. 1, there is shown a graph illustrating a lined distance between points A and B which is the overall length of the track within the area wherein train length measurements are to be taken. The distance between A and C is the distance between a certain point on the tracks and the rear position of a train. Thus subtracting the distance between A and C and the distance between A and B, the remainder is the distance between C and B which is the overall train length.

Applying the above principle to the illustration shown in FIG. 2, a railroad track 12 is shown having insulated joints 14 at point A of the track 12, and insulated joints 16 at point B of the track. A pair of wheels and axle arrangement 18 is shown on the railroad tracks to illustrate an example of where the position (L) of the rear wheels of the last car of a train might be positioned.

A transmitter includes an oscillator 20, as shown in FIG. 3, and the output of which is applied to excite a power amplifier 22. A resistor 18 connects one side of the power amplifier to one of the rails at a point P and the other side of the power amplifier 22 is connected to the other rail at point P'. The power amplifier 22, together with the resistor 18, comprises a constant current generator. This delivers a constant current to the tracks.

It should be appreciated that as the train represented by the wheels 18 departs from the positions P and P' on the track to which the current supplied from the transmitter 19, the impedance of the track looking toward the train from these points is continually being increased. Thus the train comprises a short across the tracks 14 which is moved from the points P and P'. When current is being maintained constant, the voltage of point P and P' will continually increase as the distance between the points P and P' and the train 18 increases.

A receiver 26 is also coupled to the tracks at points P and P'. The voltage received by the receiver 26 will always be that which is developed at the points P and P'. When a train represented by the wheels 18 appears on the tracks 12 and 14, a short is created across the metallic wheels and axles 18. The voltage received by receiver 26 is a function of the impedance in the tracks 12 and 14 and the wheels 18 which changes as the distance between the points P and P' and the wheels 18 changes. A computing circuit 28 is responsive to the receiver 26 and also receives the fixed voltage from a potentiometer 29. The computing circuit is arranged to provide a voltage which is the difference between the fixed voltage and the receiver 26 voltage. An output from the computing circuit 28 is applied to a readout 30, for example, which is always indicative of difference between the two voltages. This readout voltage is then indicative of the distance between the wheels 18 and the points B provided at the insulator joint 16.

To assure that the exact point of measurement is made, a detector 32 is positioned at the point B nearest the insulating joints 16. When the end of the train is sensed by the detector 32 in a suitable manner, the computing circuit then performs its computing function and provides an output on the readout 30.

To implement one function of the present invention a decision is made after a measurement of a train has been computed to place the particular train on a siding which is calculated to be large enough to hold the entire train. Thus, switching is automatically performed to place the train in an empty siding and one which is sufficient in length to hold the particular train being measured.

The switching is performed by the threshold gates 34, 36 and 38 which are calculated to provide an output to corresponding switches 40, 42 and 44, as an example. If the voltage from the computing circuit 28 is at one level, threshold gate 34 will enable switch 40 and if it is at a different level, threshold gate 36 will enable switch 42 and likewise when the voltage reaches a still different level, threshold gate 38 will open and enable a switch 44. Switches 40, 42 and 44 will then switch in appropriate sidings, siding 1, siding 2 and siding N. The switching arrangement may also be arranged whereby only sidings too small for the train or already occupied will not be opened but all others will be switched in.

Referring now to FIG. 4 there is shown a more detailed description of the receiver 26 which includes a band-pass filter 50 centered at the frequency of the oscillator 20 which is connected to the same points of the tracks 14 as the transmitter 19. The band-pass filter 50 receives a voltage representative of the length of the track between points A and B. The output therefrom is applied to an amplifier 52 which amplifies the input voltage received by the band-pass filter 50. The amplifier 52 is coupled to an amplitude detector 54 and to a quadrature detector. The quadrature detector also receives a reference from the transmitter 19 which is a signal at the same frequence as the oscillator 20. The operation of the quadrature detector and its purpose is set forth in U.S. Pat. No. 3,246,143. The outputs of the quadrature detector and the amplitude detector are coupled through the resistors 58 and 60 to the summing and inverting amplifier 62. The value of resistor 58 may have a resistance R. Thus the value of resistor 60 has a value 2R.

The output of summing amplifier 62 is coupled as an input to a gate 64 and also through a feedback resistance 66 to the input at a junction 68 between the resistance 60 and its input into summing amplifier 62. The gate 64 is enabled by the detection signal from detector 32.

The operation of the receiver 26 as shown in FIG. 4 is best illustrated in connection with the graph shown in FIG. 5. The amplitude detector 54 develops a signal $-E_{DZ}$ which is derived from the reactance component of the track input impedance. The quadrature detector 56 generates a signal denoted as $+E_{DX}$. This signal is derived from the track input impedance magnitude. The nonlinear characteristics of these two signals are best shown in FIG. 5, whereas the voltage initially increases as the distance increases but the ballast resistance in the track causes the voltage-distance vector to rise in an erroneous and nonlinear manner. Thus, neither of these voltages singularly can be used for an accurate track length measurement distance voltage due to the increasing error of these voltages with track length caused by the low ballast resistance in the tracks as a function of distance.

The receiver thus combines these two voltages to make a near linear distance voltage set forth as $E_D$ in FIG. 5. The $E_{DX}$ voltage is thus subtracted from the $E_{DZ}$ distance voltage and the difference therefrom is added into the $E_{DZ}$ voltage. This is performed in the summing amplifier 62 by the feedback line through resistor 66. Thus, the formula $2E_{DZ}-E_{DX}=E_D$ is satisfied. With reference again to FIG. 5, when the ballast resistance RB is infinite R=∞, the difference between $E_{DX}$ and $E_{DZ}$ is zero. Therefore, the track length measurement voltage $E_D=E_{DZ}$. When the ballast resistance is low, that is, $E_{DX} \neq E_{DZ}$, $E_{DZ}$ decreases with distance, but since $E_{DX}$ decreases approximately as much below $E_{DZ}$ as $E_{DZ}$ decreases below $E_D$ at infinite ballast resistance, the $QE_{DZ}-E_{DX}$ is little affected and very little error in train length measurement is counted.

Figure 7:
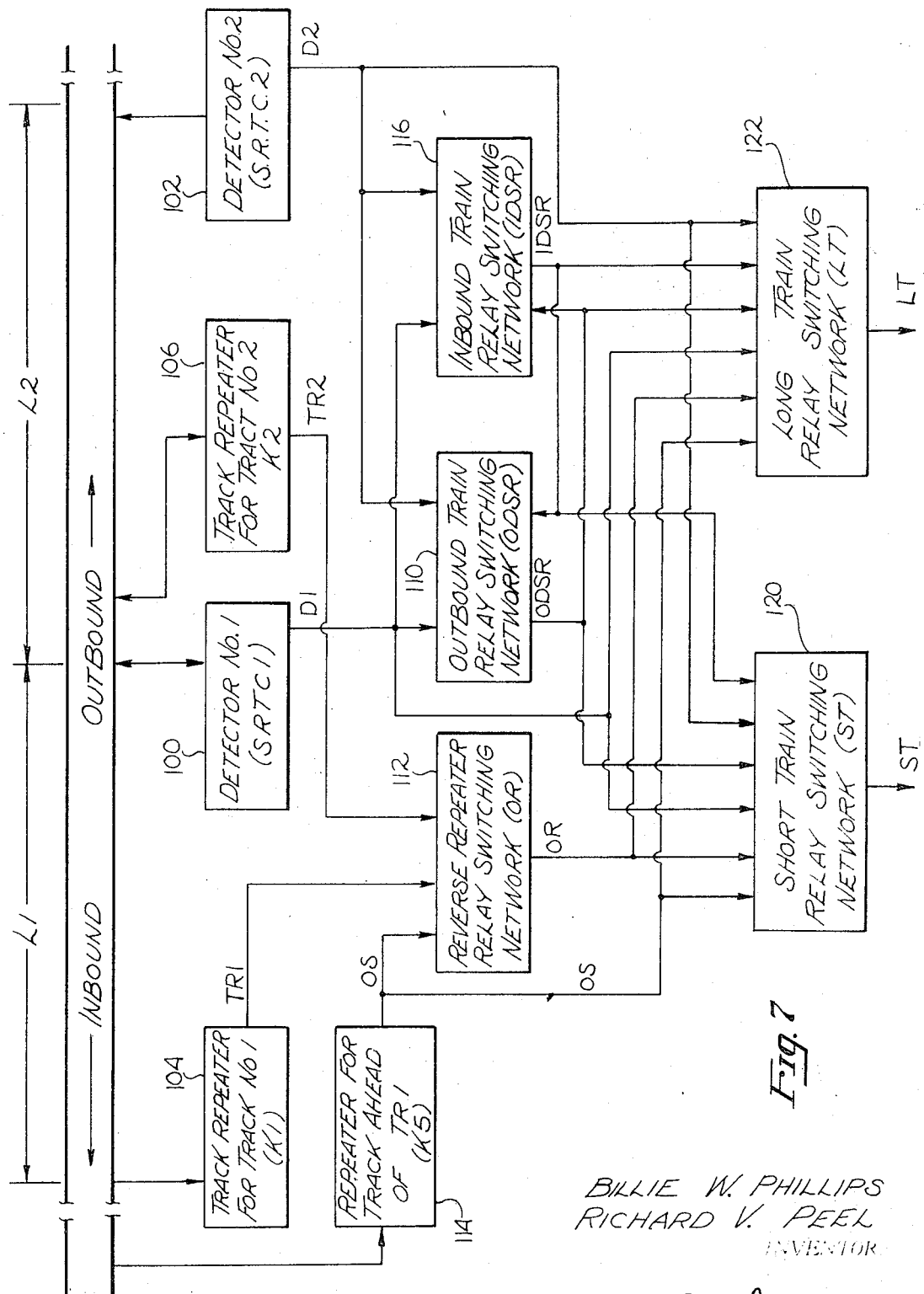
FIG. 7 is a block diagram of the dual detector system.

With reference to the drawing shown in FIG. 1, if the distance between A and B, that is, the overall track length of the measurement area, is of sufficient distance, a problem occurs in that the track error as a function of the ballast may not be fully taken care of in the error correction technique in the receiver shown in FIG. 4. In accordance with one aspect of the present invention, the track error is increased as a function of length. Thus it is desirable to make train length measurements in a shorter section if possible. Therefore the embodiment shown in FIG. 7 illustrates a dual detector system which divides a long track measurement area into two sections. Each section is referred to herein as L1 and L2 and best shown in the embodiment shown in FIG. 7. The system shown in FIG. 7 supplements the system shown in FIG. 2 to indicate a number of different parameters to determine whether there is a long track (LT) or a short track (ST). Further the system includes means for indicating whether the train is inbound towards the transmitter 19 of FIG. 2 or outbound, that is, going away from the transmitter shown in FIG. 2. The embodiment shown in FIG. 2 is thus only operable for outbound trains while the embodiment shown in FIG. 7 is indicative of inbound and outbound trains.

For example, the overall measurement area (L1+L2) may be 10,000 feet, each section (L1 or L2) being 5,000 feet in length. A detector 100 is placed at the end of section L1 and a second detector 102 is placed at the other end of section L2. The detector 100 provides an output referred to as D1 while detector 102 has an output referred to as D2. A track repeater 104 for track No. 1 (section L1) has an output indicative of TR1. This track repeater 104 is coupled to the track section end near the transmitter 19. A track repeater 106 is positioned to detect trains in the area near the detector 100 and positioned substantially at the end of the area of the track section L2 nearest the transmitter 19.

As is well known, the term repeater as applied in these circuits and in all railroad electrical circuits is a relay which is picked up when a control relay associated with the particular track is picked up, and a reverse relay is picked up when a control relay is dropped out. Thus the output of the repeater is only indicative of the absence of a train and a reverse repeater indicates a dropped out relay or the presence of a train.

A first decision is necessarily made to indicate whether the train being measured is an outbound train or an inbound train. Thus a switching network referred to as outbound train relay switching network 110 is responsive to certain decisions dictated by the detector 100, the detector 102 and a reverse repeater from a relay network 112. The reverse repeater is responsive to a repeater 114 which is coupled to an area just before the repeater 104 and outside of the measurement area. The output of repeater 114 is referred to as OS. The output of repeater 112 is thus a function of the OS and the output of repeater 104 (TR1) and the output of repeater 106 (TR2). The reverse repeater relay switching network is high when OS is low or the TR1 is low or the TR2 is low.

The outbound train relay switching network provides an output referred to as ODSR to indicate an outbound train when the signal OR from the reverse repeater relay switching network 112 is high, the signal from the repeater 114 OS is low, and the signal from inbound train relay switching network IDSR is low. A second path will hold ODSR picked up through its own output and OR as explained in more detail below in connection with IDSR.

Inbound train relay switching network 116 receives informational data from the detector 100 (D1) and the detector 102 (D2). It receives further information from the outbound train relay switching network 110. The inbound train relay switching network 116 provides an output referred to as IDSR under two conditions. The first condition being when there is a signal OR from the reverse repeater network 112, there is no signal present from the detector 102 (D2), there is no signal present from the outbound train relay switching network 110 (ODSR). The second condition circuit 110. That is to say, when the switch is already open from the inbound train and another appears present on the incoming direction, then the signals will not switch because of the fact that the relays used herein are always in their position they were at the last switching. Such relays are sometimes referred to as stick relays.

While the information above related to is applied to short train relay switching networks 120 and long train relay switching networks 122, the output of relay switching network 120 is indicative of a short train and an output from relay switching network 122 is indicative of a long train, that is, the train overlaps in areas L1 and L2 when a specific detector is energized, depending upon whether the train is inbound or outbound.

The long train switching network provides the LT output on one of the following conditions. First, an output will be provided on the LT output when there is no train detected by D1 but there is an output indicating that the output train relay switching network 110 is enabled indicating an outbound train and there is no signal from the repeater from track ahead of TR1 on the OS signal and there is no output from the short train relay being when there is a signal present from the reverse repeater relay switching network 112 and there is a signal from the inbound train relay switching circuit 110. That is to say, when the switch is already open from the inbound train and another appears present on the incoming direction, then the signals will not switch because of the fact that the relays used herein are always in their position they were at the last switching. Such relays are sometimes referred to as stick relays.

While the information above related to is applied to short train relay switching networks 120 and long train relay switching networks 122, the output of relay switching network 120 is indicative of a short train and an output from relay switching network 122 is indicative of a long train, that is, the train overlaps in areas L1 and L2 when a specific detector is energized, depending upon whether the train is inbound or outbound.

The long train switching network provides the LT output on one of the following conditions. First, an output will be provided on the LT output when there is a signal OR from the reverse repeater network 112 and a train detected by D1 and there is an output indicating that the outbound train relay switching network 110 is enabled indicating an outbound train and there is no signal from the repeater from track ahead of TR1 on the OS signal and there is no output from the short train relay switching network 120. In the alternative a long train network (LT signal) SIGNAL) is indicated when a signal OR is present from network 112 and a D1 signal is absent on detector 100, a D2 is present on detector 102, the short train switching network 120 (ST) does not have a signal therefrom and there is a signal from the inbound train relay switching network 116 (LT). Finally, there will be an output on LT when the LT signal is present from network 122 and the OR signal present from repeater 112 because of the fact that these networks are operating with stick relays.

A short train output signal (ST) is present when there is a signal OR from network 112, no D1 signal from detector 100, there is an ODSR signal from network 110 indicating that there is an outbound train and there is an OS signal from the repeater circuit 114 ahead of TR1. Also, there will be an ST signal from short train relay switching network 120 when there is a signal OR from network 112, no D1 signal from the detector 100, there is an IDSR signal indicating an inbound train from switching network 116 and there is no LT signal from switching network 122. Finally there will be an output on the short train relay switching network 120 when there is a ST signal from the network 120 and an OR signal from network 112.

Figure 6:
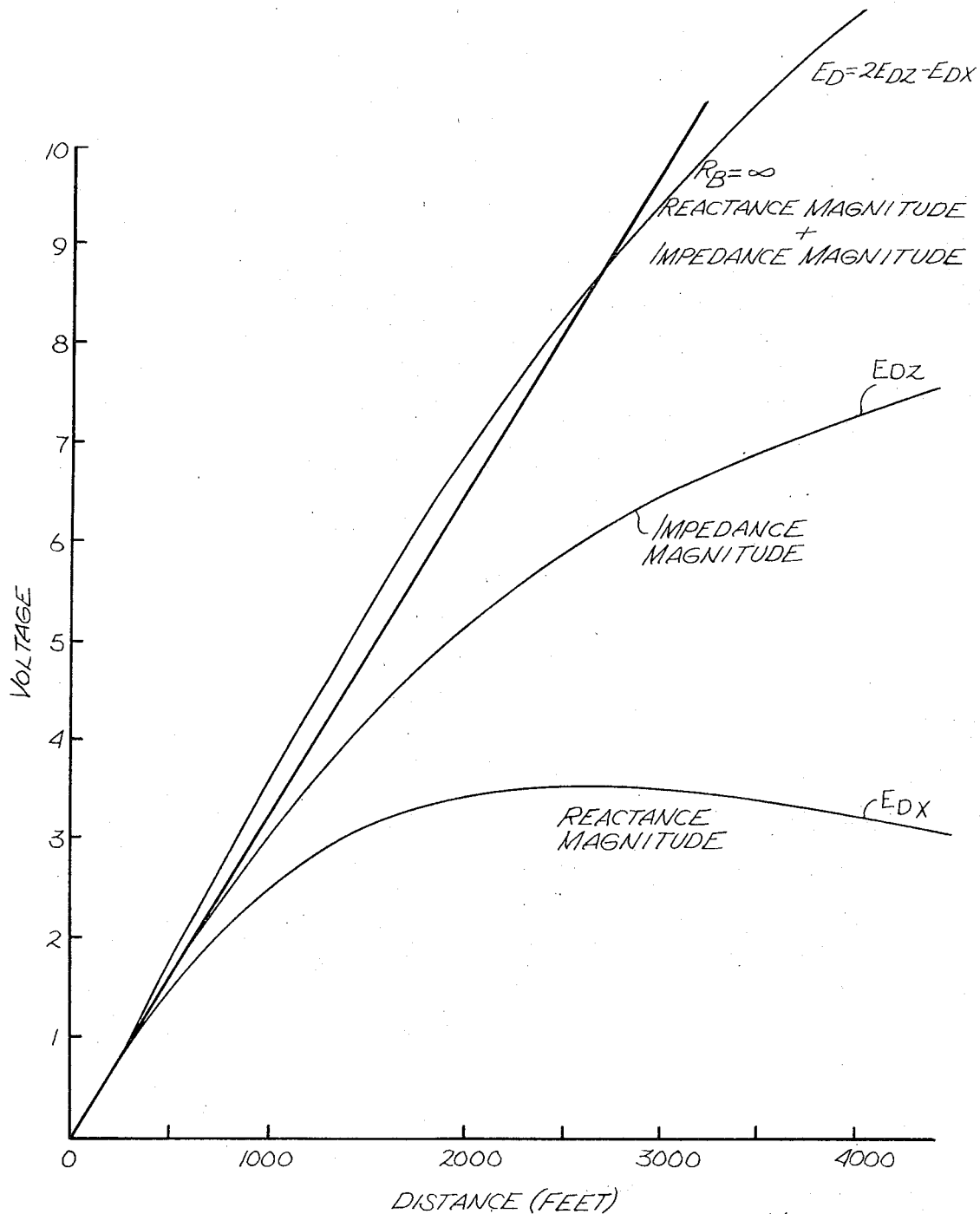
FIG. 6 is a schematic of the relay switching logic used in connection with a dual detector system.

Logically the following conditions are present for the above applying the well-known Boolean algebra techniques:

$OR = \overline{OS} + \overline{TR1} + \overline{TR2}$
$ST = OR \cdot \overline{D1} \cdot ODSR \cdot OS \cdot \overline{LT} + OR \cdot \overline{D1} \cdot IDSR \cdot D2 \cdot LT + OR \cdot ST$
$LT = OR \cdot \overline{D1} \cdot ODSR \cdot \overline{OS} \cdot \overline{ST} + OR \cdot \overline{D1} \cdot LDSR \cdot D2 \cdot \overline{ST} + OR \cdot LT$
$ODSR = OR \cdot \overline{OS} \cdot \overline{IDSR} + OR \cdot ODSR$
$IDSR = OR \cdot \overline{D2} \cdot \overline{ODSR} + OR \cdot IDSR$ The above may be accomplished by digital logic techniques using the well known AND/OR techniques. The embodiment set forth in FIG. 6 sets forth a system using relays for carrying out the above conditions.

What is claimed is:

1. A train length measurement system for measuring the length of a train within a given area of tracks divided into a first section and a second section, said system including:

receiving means for receiving electrical indications from said tracks which are functions of the tracks electrical characteristics; said means being adapted to provide indications from said first section or second sections;

a first detector being located at the end of the first track section, said first detector being adapted to indicate when a train has reached the end of the first section of track area;

a second detector being located at the end of the second track section of the track area, said second detector being adapted to indicate when a train has reached the end of the second section of the track area; and means responsive to said first detector and said second detector for determining when a train is in the first section and the second section of said train area;

means for electrically isolating the track measurement area of said tracks from the remaining portion of said tracks;

a transmitter being coupled to the isolated track area and being adapted to electrically energize said isolated track area, said transmitter being disposed at one end of the first section of the isolated track measurement area furthest from said first detector; and output means responsive to said receiving means and said first and second detectors for providing an output indication from said receiving means which is a function of the electrical characteristic of the first section when a train is in said first section and of the second section when a train is in said first and said second section.

2. The system as defined in claim 1 and further including means for applying a constant current to the tracks within the measurement area.

3. The system as defined in claim 1 wherein said output means including:
means coupled to said track for generating a first voltage indicative of the track input impedance;
means coupled to said track for generating a second voltage indicative of the reactance component of said track input impedance;
means for generating a third voltage proportional to the difference between said first voltage and said second voltage; and
means for combining said third voltage with said first voltage to provide a fourth voltage indicative of said distance.

4. The system as defined in claim 3 and wherein said means for generating said first voltage being an amplitude detector.

5. The system as defined in claim 3 and wherein said means for generating said second voltage being a quadrature detector.

6. The system as defined in claim 3 and wherein:
said means for generating said first voltage being an amplitude detector: and
said means for generating said second voltage being a quadrature detector.

7. The system as defined in claim 1 wherein said receiving means including:
a first receiver being coupled to the track area near one end of said first section and furthest from said first detector, and being adapted to receive electrical energy which is a function of the electrical characteristics of the first section of the tracks; and
a second receiver being coupled to the tracks near one end of said second section furthest from the second detector, and being adapted to receive electrical energy from the tracks which is a function of the electrical characteristics of the second section of the tracks.

8. A system for measuring the length of a train on a railroad train track including:
means coupled to said track for providing a total distance voltage which is indicative of the distance between a first point and a second point on said track, said distance being longer than the longest expected train to be measured;
means coupled to the first point of said track for providing a distance to train voltage which is indicative of the distance between the rear axle and wheels of the expected train and the first point on said track, and
means for subtracting said distance to train voltage from said total distance voltage to provide a voltage indicative of the length of the train when the front of the train is located at the second point.

9. The system as defined in claim 8 and further including:
means coupled to said track and being located near the second point for detecting when said train reaches said second point.

10. The system as defined in claim 8 wherein said track located between said first point and said second point is insulated from the remainder of the track.

11. The system as defined in claim 8 and further including means for applying a voltage to said pair of tracks.

12. The system as defined in claim 8 wherein said means for providing a distance to train voltage including:
means coupled to said track for generating a first voltage indicative of the track input impedance;
means coupled to said track for generating a second voltage indicative of the reactance component of said track input impedance;
means for generating a third voltage proportional to the difference between said first voltage and said second voltage; and
means for combining said third voltage with said first voltage to provide a fourth voltage indicative of said distance.

13. The system as defined in claim 12 wherein said means for generating said first voltage being an amplitude detector.

14. The system as defined in claim 13 wherein said means for generating said second voltage being a quadrature detector.

15. The system as defined in claim 13 wherein:
said means for generating said first voltage being an amplitude detector; and
said means for generating said second voltage being a quadrature detector.

16. A train length measurement system for measuring the length of a train within an electrically isolated area of railroad tracks, said area of tracks being divided into a first section and a second section, said system including:
a transmitter being coupled to the isolated track area and being adapted to electrically energize said isolated area of tracks, said transmitter being located at one end of the first section of the track area;
a first receiver being coupled to the track area near said transmitter, said receiver being adapted to receive electrical energy from the tracks as a function of the track impedance;
a second receiver being coupled to the track area near the end of the first section furthest from said transmitter, said receiver being adapted to receive electrical energy from the track as a function of the track impedance;
a first detector being located at the end of the first track section furthest from said transmitter and near said second receiver, said first detector being adapted to indicate when a train has reached the end of the first section of the track area;
a second detector being located at the end of the second track section of the track area furthest from said transmitter and said second detector, said second detector being adapted to indicate when a train has reached the end of the second section of the track area;
logic switching means responsive to said first detector and said second detector for determining when a train is in the first section of the train area or in the first section and the second section of said train area; and
output means responsive to said first receiver and said second receiver, and said logic switching means for providing a train length measurement from said first receiver when a train is in the first section of the train area or from said second receiver when a train is in the first section and second section of the train area.

* * * * *